US009109326B2

(12) United States Patent
Shinbayashi

(10) Patent No.: US 9,109,326 B2
(45) Date of Patent: Aug. 18, 2015

(54) ANTIBACTERIAL ARTIFICIAL HAIR AND ANTIBACTERIAL COATING AGENT FOR ARTIFICIAL HAIR

(75) Inventor: Hiroyuki Shinbayashi, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 12/745,396

(22) PCT Filed: Nov. 28, 2008

(86) PCT No.: PCT/JP2008/071655
§ 371 (c)(1),
(2), (4) Date: May 28, 2010

(87) PCT Pub. No.: WO2009/069751
PCT Pub. Date: Jun. 4, 2009

(65) Prior Publication Data
US 2010/0275939 A1 Nov. 4, 2010

(30) Foreign Application Priority Data

Nov. 30, 2007 (JP) .................................. 2007-311368

(51) Int. Cl.
| | |
|---|---|
| A41G 5/00 | (2006.01) |
| D06M 11/45 | (2006.01) |
| D06M 23/08 | (2006.01) |
| A41G 3/00 | (2006.01) |
| C09D 5/14 | (2006.01) |
| D06M 11/17 | (2006.01) |
| D06M 11/57 | (2006.01) |
| D06M 13/11 | (2006.01) |
| D06M 15/03 | (2006.01) |
| D06M 15/09 | (2006.01) |
| D06M 15/15 | (2006.01) |
| D06M 15/333 | (2006.01) |
| D06M 15/564 | (2006.01) |
| D06M 16/00 | (2006.01) |

(52) U.S. Cl.
CPC ............. *D06M 23/08* (2013.01); *A41G 3/0083* (2013.01); *C09D 5/14* (2013.01); *D06M 11/17* (2013.01); *D06M 11/45* (2013.01); *D06M 11/57* (2013.01); *D06M 13/11* (2013.01); *D06M 15/03* (2013.01); *D06M 15/09* (2013.01); *D06M 15/15* (2013.01); *D06M 15/333* (2013.01); *D06M 15/564* (2013.01); *D06M 16/00* (2013.01); *A41B 2400/34* (2013.01); *A41D 2400/34* (2013.01)

(58) Field of Classification Search
CPC ..... A41G 3/0083; A41G 3/0091; C09D 5/14; D06M 11/17; D06M 11/45; D06M 11/57; D06M 13/11; D06M 15/03; D06M 15/09; D06M 15/15; D06M 15/333; D06M 15/564; D06M 16/00; D06M 23/08
See application file for complete search history.

(56) References Cited

U.S. PATENT DOCUMENTS

| | | | | | |
|---|---|---|---|---|---|
| 3,062,214 | A | * | 11/1962 | Maxwell .................... | 606/187 |
| 3,628,974 | A | * | 12/1971 | Battista ..................... | 106/157.3 |
| 3,649,347 | A | * | 3/1972 | Battista ..................... | 428/323 |
| 4,072,742 | A | * | 2/1978 | Bouillon et al. ............. | 424/47 |
| 4,851,282 | A | * | 7/1989 | Shimizu et al. ............. | 428/375 |
| 4,961,972 | A | * | 10/1990 | Shimizu et al. ............. | 427/388.1 |
| 5,153,067 | A | * | 10/1992 | Yoshida et al. ............. | 428/402 |
| 5,157,111 | A | * | 10/1992 | Pachence .................... | 530/356 |
| 5,248,550 | A | * | 9/1993 | Turpin et al. ............... | 442/63 |
| 5,274,078 | A | * | 12/1993 | Wada et al. ................. | 530/356 |
| 5,344,917 | A | * | 9/1994 | Furukawa et al. .......... | 530/356 |
| 5,356,566 | A | | 10/1994 | Kobayashi et al. | |
| 5,370,867 | A | * | 12/1994 | Okawa et al. .............. | 424/78.02 |
| 5,385,959 | A | * | 1/1995 | Tsaur et al. ................ | 510/530 |
| 5,639,548 | A | * | 6/1997 | Sano et al. ................. | 428/364 |
| 6,048,520 | A | * | 4/2000 | Hoshowski ................ | 424/70.17 |
| 6,160,096 | A | * | 12/2000 | Sakashita et al. .......... | 530/356 |
| 6,242,573 | B1 | * | 6/2001 | Goto et al. ................. | 530/356 |
| 6,296,934 | B1 | * | 10/2001 | Needham et al. .......... | 428/372 |
| 6,713,537 | B1 | * | 3/2004 | Ueda et al. ................. | 524/17 |
| 6,749,642 | B1 | * | 6/2004 | Ueda et al. ................. | 8/127.5 |
| 7,186,806 | B2 | * | 3/2007 | Ueda et al. ................. | 530/356 |
| 8,178,080 | B2 | * | 5/2012 | Kulcsar ..................... | 424/70.12 |
| 2002/0182238 | A1 | * | 12/2002 | Creton ....................... | 424/401 |
| 2003/0044368 | A1 | * | 3/2003 | Tsuchikura ................. | 424/65 |
| 2003/0180369 | A1 | * | 9/2003 | Grisoni ...................... | 424/490 |
| 2004/0037792 | A1 | * | 2/2004 | Hiramoto et al. ........... | 424/65 |
| 2004/0137227 | A1 | * | 7/2004 | Masuda et al. ............. | 428/395 |
| 2009/0173356 | A1 | * | 7/2009 | Kano .......................... | 132/53 |

(Continued)

FOREIGN PATENT DOCUMENTS

| | | | |
|---|---|---|---|
| EP | 2031011 A1 | * | 3/2009 |
| JP | 43-25829 B | | 11/1943 |

(Continued)

OTHER PUBLICATIONS

International Search Report of PCT/JP2008/071655, Mailing Date of Mar. 17, 2009.

(Continued)

*Primary Examiner* — Elizabeth Cole
(74) *Attorney, Agent, or Firm* — Westerman, Hattori, Daniels & Adrian, LLP

(57) ABSTRACT

An antibacterial artificial hair of the present invention includes an artificial hair and organic resin particles adhering to the artificial hair. The organic resin particles are powdered fine particles including an organic resin and an aluminum salt that is chemically bonded to the organic resin. An antibacterial coating agent for artificial hair of the present invention is used for an artificial hair and obtained by dispersing the organic resin particles in an aqueous medium. The presence of the organic resin particles including the aluminum salt not only provides the luster and texture similar to those of human hair, but also imparts the antibacterial properties.

32 Claims, No Drawings

(56) References Cited

U.S. PATENT DOCUMENTS

| | | | |
|---|---|---|---|
| 2009/0246280 A1* | 10/2009 | Yamashita | 424/486 |
| 2009/0260646 A1* | 10/2009 | Masuda | 132/53 |
| 2010/0275939 A1* | 11/2010 | Shinbayashi | 132/53 |
| 2011/0120484 A1* | 5/2011 | Matsumoto et al. | 132/53 |

FOREIGN PATENT DOCUMENTS

| | | | |
|---|---|---|---|
| JP | 43-27513 B | | 11/1943 |
| JP | 46-15033 B | | 4/1971 |
| JP | 47-30466 | | 11/1972 |
| JP | 47-030466 A | | 11/1972 |
| JP | 55-107512 A | | 8/1980 |
| JP | 62-034880 A | | 2/1987 |
| JP | 62-034880 B2 | | 7/1987 |
| JP | 03-255200 A | | 11/1991 |
| JP | 9-273080 A | | 10/1997 |
| JP | 09-273080 A | | 10/1997 |
| JP | 2002-249982 A | | 9/2002 |
| JP | 2008088585 A | * | 4/2008 |
| JP | 2009127163 A | * | 6/2009 |
| JP | 2009138314 A | * | 6/2009 |
| JP | 2010077202 A | * | 4/2010 |
| JP | 2010150715 A | * | 7/2010 |
| WO | 01-00920 A1 | | 1/2001 |
| WO | 01/00920 A1 | | 1/2001 |
| WO | WO 2007142097 A1 | * | 12/2007 |
| WO | WO 2009035052 A1 | * | 3/2009 |

OTHER PUBLICATIONS

Japanese Office Action issued Mar. 23, 2010 in corresponding application No. JP2009-543872.

* cited by examiner

ANTIBACTERIAL ARTIFICIAL HAIR AND ANTIBACTERIAL COATING AGENT FOR ARTIFICIAL HAIR

This application is a 371 of PCT/JP2008/071655 filed Nov. 28, 2008.

TECHNICAL FIELD

The present invention relates to an antibacterial artificial hair that resembles human hair in its natural luster and moist texture without a squeaky (waxy) feeling, and to a coating agent used for the antibacterial artificial hair.

BACKGROUND ART

Conventionally, human hair and artificial hair (modacrylic fiber or polyvinyl chloride fiber) have been used in hair productions such as a hairpiece, a hair wig, a hair extension, a hair bundle, and a doll hair. However, it gradually becomes difficult to obtain the human hair, and the artificial hair is increasingly important instead. Although the modacrylic fiber has been widely used as a raw material of the artificial hair due to the advantage of being flame retardant, it is insufficient in terms of the heat-resistant temperature. In recent years, a polyester fiber that includes polyester as the main component (typified by polyethylene terephthalate with excellent heat resistance) has been proposed as an artificial hair fiber. However, the polyester fiber itself has a high gloss, a hard touch, and a squeaky (waxy) feeling, and therefore can cause a problem when used as a raw material of the artificial hair. For this reason, some methods for improving the luster and texture of the polyester fiber have been proposed. In general, the fiber surface is made rough to improve the luster or to change the texture. For example, titanium oxide fine particles are added to deluster the polyester fiber. However, it is well known that this method merely removes the gloss from the fiber surface and leads to poor color development. Another technique has been proposed in which the polyester fiber including inorganic fine particles is alkali-etched so that particular projections and depressions are formed in the fiber surface (Patent Document 1). In this technique, although a high hyperchromic effect can be obtained by the uneven fiber surface, the luster is reduced. Thus, it is difficult to achieve the hyperchromic effect while maintaining the luster. Moreover, a method for mixing fine particles with a polymer matrix has been proposed. However, this method raises the problems of the aggregation of the fine particles in the polymer, an increase in viscosity of the polymer melt or solution, the decomposition and degradation of the fine particles and the polymer during the manufacturing process, a decrease in the physical properties of the formed fiber, etc.

In addition to the above problems, the conventional artificial hair has low antibacterial properties. If the antibacterial properties are low, bacteria can generate and proliferate while the artificial hair is worn for a long time or stored after being used.

On the other hand, a method for coating a resin sheet or the like with regenerated collagen or regenerated collagen particles, which are different from those produced by the method of the present invention, has been proposed (Patent Documents 2 to 4). However, this method is intended to give a leather texture rather than to improve the antibacterial properties.

Patent Document 1: JP S55 (1980)-107512 A
Patent Document 2: JP S62 (1987)-34880 B
Patent Document 3: JP H3 (1991)-255200 A
Patent Document 4: JP H9 (1997)-273080 A

DISCLOSURE OF INVENTION

Problem to be Solved by the Invention

To solve the above conventional problems, the present invention provides an antibacterial artificial hair and an antibacterial coating agent for artificial hair that have antibacterial properties and can maintain the properties.

Means for Solving Problem

An antibacterial artificial hair of the present invention includes an artificial hair and organic resin particles adhering to the artificial hair. The organic resin particles are powdered fine particles including an organic resin and an aluminum salt that is chemically bonded to the organic resin.

An antibacterial coating agent for artificial hair of the present invention is a coating agent used for artificial hair and includes the above organic resin particles dispersed in an aqueous medium.

Effects of the Invention

The antibacterial artificial hair and the antibacterial coating agent for artificial hair of the present invention have antibacterial properties and can maintain the properties due to the presence of the organic resin particles including the aluminum salt.

DESCRIPTION OF THE INVENTION

1. Artificial Hair Fiber

The artificial hair fiber used in the present invention can be a synthetic fiber. The synthetic fiber may be either a crystalline fiber or a non-crystalline fiber. Specific examples of the synthetic fiber include the following: polyolefin that is an olefin homopolymer such as low-density polyethylene, high-density polyethylene, polypropylene, poly1-butene, or poly4-methyl-1-pentene; polyolefin that is an α-olefin random or block copolymer such as ethylene, propylene, 1-butene, or 4-methyl-1-pentene; an ethylene-vinyl compound copolymer such as an ethylene-acrylic acid copolymer, an ethylene-vinyl acetate copolymer, an ethylene-vinyl alcohol copolymer, or an ethylene-vinyl chloride copolymer; a styrene compound copolymer such as polystyrene, an acrylonitrile-styrene copolymer, an acrylonitrile-butadiene-styrene copolymer, a methyl methacrylate-styrene copolymer, or an α-methylstyrene-styrene copolymer; a polyvinyl compound such as a polyvinyl chloride, a polyvinylidene chloride, a vinyl chloride-vinylidene chloride copolymer, polymethyl acrylate, or polymethyl methacrylate; polyamide such as nylon 6, nylon 6-6, nylon 6-10, nylon 11, or nylon 12; a thermoplastic polyester such as polyethylene terephthalate or polybutylene terephthalate; polycarbonate; and a polyphenylene oxide. These synthetic fibers can be used individually or in combinations of two or more. Moreover, the above synthetic resins may be mixed in the molten state before being formed into fibers.

Among these synthetic fibers, modacrylic, a polyvinyl chloride, a polyvinylidene chloride, polypropylene, polyethylene terephthalate, polypropylene terephthalate, polybutylene terephthalate, and copolymerized polyesters (obtained by copolymerization of polyethylene terephthalate, which is the main component, with any of bisphenol A ethylene glycol ether, 1,4-cyclohexanedimethanol, and 5-sodiumsulfoisophthalate) are preferred, and two or more of them may be mixed.

For example, when a polyester fiber is used in the present invention, a polyester composition is dry blended, and then melt kneaded using various general kneading machines. Examples of the kneading machine include a single-screw extruder, a twin-screw extruder, a roll, a Banbury mixer, and a kneader. In particular, the twin-screw extruder is preferred in terms of the adjustment of the degree of kneading and ease of operation. The polyester artificial hair of the present invention can be produced by melt spinning the above polyester composition with a conventional melt spinning method. For example, the polyester composition is melt spun into yarns while the temperatures of an extruder, a gear pump, a spinneret, etc. are set to 270 to 310° C. Then, the spun yarns are allowed to pass through a heated tube, cooled to the glass transition point or less, and wound up at a speed of 50 to 5000 m/min. Moreover, the spun yarns may be cooled in a water bath containing cooling water so as to control the fineness. The temperature and length of the heated tube, the temperature and amount of the cooling air applied, the temperature of the cooling water bath, the cooling time, and the winding speed can be appropriately adjusted in accordance with the extrusion rate and the number of holes of the spinneret. The resultant spun yarns may be hot drawn by either a two-step method or a direct drawing method. In the two-step method, the spun yarns are once wound, and then drawn. In the direct drawing method, the spun yarns are continuously drawn without winding. The hot drawing may be performed by a single-stage drawing method or a multi-stage drawing method that includes two or more stages. The heating means for the hot drawing may be, e.g., a heating roller, a heat plate, a steam jet apparatus, or a hot water bath, and they can be used in combination as desired. The drawing temperature is preferably higher than Tg of the polyester serving as a base, and can be 50 to 100° C.

The artificial hair used in the present invention is preferably a fiber like an uncrimped raw silk. Although the fineness of the fiber is not particularly limited, a suitable fineness for the artificial hair is generally 10 to 100 dtex, and more preferably 20 to 90 dtex.

Next, the antibacterial artificial hair of the present invention includes the above artificial hair to which organic resin particles adhere. In an embodiment, the antibacterial artificial hair of the present invention can be produced by applying a mixed solution of the organic resin particles and an aqueous coating agent to the fiber surface of the artificial hair that has been subjected to spinning, drawing, and heat-treating processes. The organic resin particles are powdered fine particles including an organic resin and an aluminum salt that is chemically bonded to the organic resin, as will be described below.

2. Organic Resin Particles

In the present invention, the organic resin particles are powdered fine particles including the organic resin and the aluminum salt that is chemically bonded to the organic resin (also referred to as organic resin particles of the present invention in the following). The organic resin included in the organic resin particles is not particularly limited, but is preferably at least one selected from regenerated collagen, polyvinyl alcohol, and carboxymethyl cellulose or a combination thereof in terms of improving the tactile properties (moist feeling) and the texture. Therefore, preferred embodiments of the organic resin particles include the following: organic resin particles including the regenerated collagen as an organic resin (also referred to as regenerated collagen particles in the following); organic resin particles including the polyvinyl alcohol as an organic resin (also referred to as polyvinyl alcohol particles in the following); and organic resin particles including the carboxymethyl cellulose as an organic resin (also referred to as carboxymethyl cellulose particles in the following). In particular, the regenerated collagen particles are preferred because they make the artificial hair cool to the touch and have the tactile properties that are closer to human hair than those achieved by the two other particles. In the present specification, the particles are also referred to as a powder. The organic resin particles may include either one type of organic resin or two or more types of organic resins. When the organic resin particles include two or more types of organic resins, the content of regenerated collagen, polyvinyl alcohol, carboxymethyl cellulose, or a combination thereof is preferably 50 wt % or more, more preferably 75 wt % or more, even more preferably 95 wt % or more, and further preferably 99 wt % or more of the total weight of the organic resins included in the organic resin particles in terms of the antibacterial properties of the antibacterial artificial hair of the present invention and the artificial hair quality. The organic resin particles of the present invention may exhibit the antibacterial properties. Although the detailed mechanism of the antibacterial properties of the organic resin particles is unclear, it is assumed that the organic resin particles have a high phosphorus adsorption capacity because of the aluminum salt that is chemically bonded to the organic resin, and thus can capture phosphorus that is a nutrient of bacteria, which may result in the antibacterial properties. However, the present invention is not limited to this mechanism. In the context of the present invention, the "antibacterial properties" indicate preferably that both the antibacterial artificial hair and the antibacterial coating agent for artificial hair of the present invention include the organic resin particles of the present invention, more preferably that the growth of microorganisms that come into contact with the organic resin particles can be suppressed, and even more preferably that the microorganisms that come into contact with the organic resin particles can be killed.

(1) Regenerated Collagen Particles

As an embodiment of the organic resin particles of the present invention, regenerated collagen particles will be described below. In the present invention, a solubilized collagen solution is produced using the skins, bones, tendons, etc. of animals such as cattle, pigs, horses, deer, rabbits, birds, and fishes and subjected to a cross-linking treatment, thereby providing a new collagen powder that may solve the quality problems of a conventional collagen powder. Moreover, the solubilized collagen aqueous solution is spun into regenerated collagen fibers, so that the collagen can be thoroughly purified, and dense cross-linking can be achieved in the process of fiber formation by spinning. Thus, the present invention provides a completely new collagen powder.

It is preferable that a flesh split is used as a material for producing the regenerated collagen, as disclosed, e.g., in JP 2002-249982 A. The flesh split is obtained, e.g., from a fresh hide or salted rawhide of animals such as cattle, pigs, horses, deer, rabbits, birds, and fishes. The flesh split is mainly composed of insoluble collagen fibers, and a fleshy portion is usually attached to the fibers in the form of a network. Therefore, the fleshy portion should be removed, along with the salt used to prevent corrosion and alternation, before the flesh split is used. Other materials such as bones and tendons of the above animals can be used as well.

The insoluble collagen fibers include impurities, e.g., lipids such as glyceride, phospholipid, and a free fatty acid, proteins other than collagen such as glycoprotein and albumin, or the like. These impurities significantly affect the quality (luster or strength) and the odor in performing a pulverization process. Therefore, it is preferable that the impurities are removed in advance, e.g., by liming the flesh split so as to hydrolyze the fat in the insoluble collagen fibers, disentangling the collagen fibers, and then performing general leather processing such as an acid/alkali treatment, an enzyme treatment, or a solvent treatment.

Next, the insoluble collagen thus treated is subjected to a solubilization process to dissociate the cross-linked peptides. The solubilization process may be, e.g., a conventionally known alkali solubilization process or enzyme solubilization process. In the case of the alkali solubilization process, it preferably includes neutralization with an acid such as a hydrochloric acid. Also, a method disclosed in JP S46 (1971)-15033 B may be used, which is the improved method of the conventionally known alkali solubilization process.

The enzyme solubilization process has the advantage of being able to provide regenerated collagen with a uniform molecular weight, and may be suitably used in the present invention. Such an enzyme solubilization process is disclosed, e.g., in JP 543 (1968)-25829 B or JP 543 (1968)-27513 B. Moreover, the alkali solubilization process may be used in combination with the enzyme solubilization process.

It is preferable that the solubilized collagen is further subjected to operations such as a pH adjustment, salting-out, washing, and a solvent treatment, since these operations can impart excellent quality to the regenerated collagen. For example, the solubilized collagen is dissolved in an acid solution whose pH is adjusted to 2 to 4.5 with a hydrochloric acid, an acetic acid, a lactic acid, or the like to form a stock solution having a predetermined concentration of about 1 to 15 wt %, and preferably about 2 to 10 wt %. The solubilized collagen aqueous solution, if necessary, may be defoamed by stirring under reduced pressure and filtered to remove small unwanted substances that are insoluble in water. Moreover, the solubilized collagen aqueous solution, if necessary, may be blended with an appropriate amount of an additive such as a stabilizer or a water-soluble polymer compound in order not only to improve the mechanical strength, the water and heat resistance, the luster, and the spinnability, but also to prevent coloring and corrosion.

The solubilized collagen aqueous solution is forced through a spinning nozzle or a slit into an inorganic salt aqueous solution, thereby forming regenerated collagen. The inorganic salt aqueous solution may be, e.g., an aqueous solution of a water-soluble inorganic salt such as a sodium sulfate, a sodium chloride, or an ammonium sulfate. In general, the concentration of the inorganic salt is adjusted to 10 to 40 wt %. The pH of the inorganic salt aqueous solution is adjusted generally in the range of 2 to 13, and preferably in the range of 4 to 12 by the addition of metal salts such as sodium borate and sodium acetate, a hydrochloric acid, a boric acid, an acetic acid, or a sodium hydroxide. If the pH is within the above range, the peptide bond of the collagen is not likely to undergo hydrolysis, so that the intended collagen powder can be obtained. The temperature of the inorganic salt aqueous solution is not particularly limited, but is generally 35° C. or less. If the temperature is 35° C. or less, the solubilized collagen is not denatured, high strength can be maintained, and thus stable production can be achieved. The lower limit of the temperature is not particularly limited and may be appropriately adjusted in accordance with the solubility of the inorganic salt.

To improve the water resistance of the collagen, a free amino group of the collagen is modified with an organic group having a hydroxyl group or an alkoxy group in the β-position or the γ-position. The organic group having a hydroxyl group or an alkoxy group in the β-position or the γ-position is preferably an alkyl group having a hydroxyl group or an alkoxy group in the β-position or the γ-position and 2 to 20 carbon atoms in the main chain. In this case, the number of carbon atoms in the main chain indicates a continuous carbon chain of the alkyl group bonded to the amino group, and the number of carbon atoms that are arranged with other atoms intervening between them is not taken into account. The reaction to modify the free amino group can be a commonly known alkylation reaction of the amino group. In view of reactivity and ease of processing after the reaction, the organic group having a hydroxyl group or an alkoxy group in the β-position is preferably a compound expressed by the following general formula (2):

$$—CH_2—CH(OX)—R \qquad (2)$$

where R represents a substituent expressed as $R^1—$, $R^2—O—CH_2—$, $R^2—CO—CH_2—$, or $R^2—COO—CH_2—$, $R^1$ in the substituent represents a hydrocarbon group having a carbon number of 2 or more or $CH_2Cl$, $R^2$ in the substituent represents a hydrocarbon group having a carbon number of 2 or more or a carbon number of 4 or more, and X represents hydrogen or a hydrocarbon group. $R^1$ is preferably an alkyl group that includes a straight chain or a branched chain and has a carbon number of 2 or more. The number of carbon atoms of $R^1$ is preferably 2 to 20, and more preferably 2 to 15. $R^2$ is preferably an alkyl group that includes a straight chain or a branched chain and has a carbon number of 2 or more or a carbon number of 4 or more. The number of carbon atoms of $R^2$ is preferably 2 to 20 or 4 to 20, and more preferably 2 to 15 or 4 to 15. Preferred examples of the general formula (2) include a 3-hydroxybutyl group, a 1-chloro-2-hydroxypropyl group, and a 1-propionyl-2-hydroxypropyl group. Moreover, the general formula (2) may include a structure in which a glycidyl group is added to the free amino group of the collagen. Further, the general formula (2) may include a structure formed by the ring-opening addition and/or ring-opening polymerization of an epoxy compound using the hydroxyl group of the organic group (preferably the alkyl group) as a starting point. In this case, the alkyl group with the above structure can be the end structure of the addition and/or the polymerization.

The amino acids that constitute the free amino group of the regenerated collagen include lysine and hydroxylysine. When hydrolysis is performed under the alkaline conditions to provide regenerated collagen, arginine that is originally one of the amino acids constituting the collagen is partially hydrolyzed to produce ornithine. The amino group of the ornithine is also involved in the alkylation reaction. Moreover, the reaction proceeds with the secondary amine of histidine.

The modification ratio of the free amino group can be measured by amino acid analysis. The modification ratio is calculated based on the value determined by the amino acid analysis of the regenerated collagen fiber before the alkylation reaction, or the known composition of the free amino acids constituting the collagen that is used as a material. In the present invention, at least 50% of the free amino group may be modified with the organic group having a hydroxyl group or an alkoxy group in the β-position or the γ-position, and preferably with the alkyl group having a hydroxyl group or an alkoxy group in the β-position or the γ-position and a carbon number of 2 or more. The remaining portion may be either unchanged (i.e., remain the free amino group) or modified with another substituent. The modification ratio of the free amino group of the regenerated collagen should be 50% or more, more preferably 65% or more, and even more preferably 80% or more. If the reactivity is low, good heat resistance cannot be achieved.

In the modification of the free amino group, one molecule of an alkylating agent usually reacts with a free amino group. Needless to say, two or more molecules of the alkylating agent may react with a free amino group. Moreover, an intramolecular or intermolecular cross-linking reaction may occur via the hydroxyl group or the alkoxy group in the β-position or the γ-position of the alkyl group bonded to the free amino group, or via other functional groups. The specific examples of the alkylation reaction include the following: an addition reaction of the epoxy compound; an addition reaction of an aldehyde compound having a hydroxyl group or its derivative in the α-position or the β-position and the subsequent reduction reaction; and a substitution reaction of a halide, alcohol, or amine having a hydroxyl group or an alkoxy group in the β-position or the γ-position and a carbon number of 2 or more. However, the alkylation reaction is not limited thereto.

In the present invention, organic compounds that can be used as the alkylating agent include aldehydes, epoxies, and phenol derivatives. Among them, in view of reactivity and ease of process conditions, the modification reaction with the epoxy compound is preferred because it provides excellent properties. In particular, a monofunctional epoxy compound is preferred.

The specific examples of the monofunctional epoxy compound includes the following: olefin oxides such as an ethylene oxide, a propylene oxide, a butylene oxide, an isobutylene oxide, an octene oxide, a styrene oxide, a methyl styrene oxide, epichlorohydrin, epibromohydrin, and glycidol; glycidyl ethers such as glycidyl methyl ether, butyl glycidyl ether, octyl glycidyl ether, nonyl glycidyl ether, undecyl glycidyl ether, tridecyl glycidyl ether, pentadecyl glycidyl ether, 2-ethylhexyl glycidyl ether, allyl glycidyl ether, phenyl glycidyl ether, cresyl glycidyl ether, t-butylphenyl glycidyl ether, dibromophenyl glycidyl ether, benzyl glycidyl ether, and polyethylene oxide glycidyl ether; glycidyl esters such as glycidyl formate, glycidyl acetate, glycidyl acrylate, glycidyl methacrylate, and glycidyl benzoate; and glycidyl amides. However, the monofunctional epoxy compound is not limited thereto.

Among the above monofunctional epoxy compounds, the monofunctional epoxy compound expressed by the following general formula (1) is preferably used, since the water absorption of the regenerated collagen is reduced. Therefore, the organic resin particles preferably include the cross-linking component derived from the monofunctional epoxy compound of the following general formula (1).

[Chemical Formula 1]

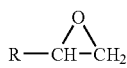

(1)

where R represents a substituent expressed as $R^1-$, $R^2-O-CH_2-$, $R^2-CO-CH_2-$, or $R^2-COO-CH_2-$, $R^1$ represents a hydrocarbon group having a carbon number of 2 or more or $CH_2Cl$, and $R^2$ represents a hydrocarbon group having a carbon number of 2 or more, and preferably a hydrocarbon group having a carbon number of 4 or more. $R^1$ is preferably an alkyl group that includes a straight chain or a branched chain and has a carbon number of 2 or more. The number of carbon atoms of $R^1$ is preferably 2 to 20, and more preferably 2 to 15. $R^2$ is preferably an alkyl group that includes a straight chain or a branched chain and has a carbon number of 2 or more or a carbon number of 4 or more. The number of carbon atoms of $R^2$ is preferably 2 to 20 or 4 to 20, and more preferably 2 to 15 or 4 to 15.

The regenerated collagen thus obtained swells with water or the inorganic salt aqueous solution. It is preferable that the swollen regenerated collagen contains water or the inorganic salt aqueous solution in an amount of 4 to 15 times the weight of the regenerated collagen. If the content of water or the inorganic salt aqueous solution is 4 times or more, the regenerated collagen has a high content of aluminum salt and therefore is sufficiently water-resistant. If the content of water or the inorganic salt aqueous solution is 15 times or less, the strength is not reduced, and the handling properties are good.

Next, the swollen regenerated collagen is immersed in an aluminum salt aqueous solution. The aluminum salt included in this aluminum salt aqueous solution is preferably a basic aluminum chloride or a basic aluminum sulfate expressed as $Al(OH)_nCl_{3-n}$ or $Al_2(OH)_{2n}(SO_4)_{3-n}$ (where n is 0.5 to 2.5). Specific examples of the aluminum salt include an aluminum sulfate, an aluminum chloride, and alum. These aluminum salts can be used individually or in combinations of two or more. The aluminum salt concentration of the aluminum salt aqueous solution is preferably 0.3 to 5 wt %, which is expressed in terms of aluminum oxide. If the aluminum salt concentration is 0.3 wt % or more, the regenerated collagen fiber has a high content of aluminum salt and therefore is sufficiently water-resistant. If the aluminum salt concentration is 5 wt % or less, the regenerated collagen fiber is not so hard after the treatment, and the handling properties are good.

The pH of the aluminum salt aqueous solution is generally adjusted to 2.5 to 5 with, e.g., a hydrochloric acid, a sulfuric acid, an acetic acid, a sodium hydroxide, or a sodium carbonate. If the pH is 2.5 or more, the collagen structure can be suitably maintained. If the pH is 5 or less, the aluminum salt does not precipitate out, and the aluminum salt aqueous solution is likely to penetrate uniformly into the regenerated collagen. The pH may be first adjusted to 2.2 to 3.5 so that the aluminum salt aqueous solution penetrates fully into the regenerated collagen, and then adjusted to 3.5 to 5, e.g., by the addition of a sodium hydroxide or a sodium carbonate, thus completing the treatment. In the case of the aluminum salt that is highly basic, only the first pH adjustment in the range of 2.5 to 5 may be required. The temperature of the aluminum salt aqueous solution is not particularly limited, but is preferably 50° C. or less. If the temperature is 50° C. or less, the regenerated collagen is not likely to be denatured or altered.

The regenerated collagen is immersed in the aluminum salt aqueous solution for 3 hours or more, and preferably 6 to 25 hours. If the immersion time is 3 hours or more, the reaction of the aluminum salt proceeds, and the regenerated collagen becomes sufficiently water-resistant. Although the upper limit of the immersion time is not particularly limited, the reaction of the aluminum salt proceeds sufficiently within 25 hours, and the regenerated collagen has good water resistance. To prevent a nonuniform concentration caused by quick absorption of the aluminum salt into the regenerated collagen, an inorganic salt such as a sodium chloride, a sodium sulfate, or a potassium chloride may be appropriately added to the aluminum salt aqueous solution.

The cross-linked regenerated collagen treated with the aluminum salt is then subjected to washing, oiling, and drying. Unlike the regenerated collagen treated with a chrome salt by the conventional method, the resultant regenerated collagen fiber is almost colorless and has good water resistance. In general, to prevent denaturation (gelatinization) of the collagen, care should be taken of the temperature history during processing. Moreover, to prevent the denaturation of the collagen even after cross-linking, it is necessary to control both moisture and temperature in the manufacture, the pulverization, and the storage of the product below the level at which the regenerated collagen is denatured. If most of the collagen is gelatinized, the characteristics of the collagen are changed. This makes it difficult to achieve the intended collagen characteristics. Therefore, the above regenerated collage is useful to prevent the denaturation.

When the collagen solution is spun into fibers, a pigment or dye has been mixed with the solution or may be added to the solution immediately before the spinning, so that the fibers are easily colored by a known method. The pigment or dye may be selected in accordance with the intended use so as not to be eluted or separated during the spinning or pulverization process. Moreover, the type and color of the pigment or dye may be selected in accordance with the required quality of a product to be used. A filler, an age inhibitor, a flame retardant, an antioxidant, etc. may be added as needed. Instead of this collagen fiber formation process, a film may be produced in the same manner using a slit nozzle and pulverized into a powder.

In the present invention, the regenerated collagen obtained by the above method is pulverized into a collagen powder (i.e., a regenerated collagen powder) including the cross-linked regenerated collagen. When the regenerated collagen is in the form of a fiber or film, it may be cut to a fiber length or size suitable for the pulverization, or the cut fiber or film may be further pulverized. Alternatively, the fiber or film may be directly pulverized into a regenerated collagen powder. There is no particular limitation to the cutter that can be used to produce the regenerated collagen powder. For example, the fiber or film is cut to about 0.1 mm to several mm with a cutter that is generally used to cut fibers, such as a rotary knife cutter, a belt cutter, a shearing machine, or a cutter mill. Subsequently, the cut cotton is pulverized into fine particles with a pulverizer, e.g., a shearing mill such as a roller mill, a rod mill, a ball mill (dry type or wet type), a jet mill, a pin mill, a vibration mill, a centrifugal (CF) mill, a planetary ball mill, or a grinder mill, or pulverized into ultrafine particles with a micro-pulverizer using a grinding medium. Hard grinding balls such as zirconia balls are preferred because the ball material is prevented from being mixed with the powder and the pulverization efficiency is improved. The grinding balls made of other materials such as alumina balls also can be used. As another pulverization method, freeze pulverization may be used. The average particle size of the regenerated collagen powder is preferably 0.01 to 80 µm.

The aluminum content is preferably 0.1 to 70 wt %, more preferably 0.2 to 50 wt %, and particularly preferably 1 to 40 wt %, which is expressed in terms of a metal element of the regenerated collagen powder.

The average particle size of the regenerated collagen powder used in the present invention is preferably 0.01 to 10 µm. Such a regenerated collagen powder can be produced, e.g., by pulverization or pulverization and the subsequent classification. In terms of the texture, the average particle size is preferably 0.1 to 10 µm, and more preferably 1 to 8 µm. If the average particle size is larger than the above range, the artificial hair coated with the coating agent is rough to the touch.

The particle size of the regenerated collagen powder may be appropriately adjusted in accordance with the type of the pulverizer and the pulverization time. For example, the use of the vibration mill for 1 hour to several tens of hours can produce a regenerated collagen powder with an average particle size of about 5 to 80 µm. Moreover, the average particle size can be 0.01 to 5 µm by classifying the pulverized regenerated collagen powder. The classification may be either air classification or water classification.

It is preferable that the average particle size of the classified powder is 10 µm or less, and 95 wt % of the particles have a particle size of 50 µm or less. It is more preferable that the average particle size of the classified powder is 5 µm or less, and 95 wt % of the particles have a particle size of 20 µm or less. Within these ranges, the coated article can have a smooth texture and good moisture adsorption and desorption properties.

The collagen powder of the present invention has a high degree of whiteness. In the present invention, since the collagen is sufficiently purified and the impurities are removed in the process of forming the collagen fiber, the collagen powder has a high degree of whiteness and is less yellowish.

The particle distribution and the average particle size can be measured by a commercially available particle size distribution analyzer. For example, the measurement can be performed with a laser diffraction/dynamic light scattering method (using devices such as "ELS-800" manufactured by Otsuka Electronics Co., Ltd. and "MT3300" manufactured by Nikkiso Co., Ltd.). The dispersion medium may be, e.g., methanol. The particle refractive index is 1.44, which is the refractive index of collagen.

The regenerated collagen powder of the present invention has a phosphorus adsorption capacity. Therefore, another aspect of the present invention relates to a phosphorus adsorbent containing the regenerated collagen powder or a phosphorus adsorbent body including a carrier that holds the regenerated collagen powder. The phosphorus to be adsorbed is not particularly limited as long as it is a phosphorus compound or a substance including a phosphorus element. For example, a phosphoric acid structure can be adsorbed. The phosphorus acid structure is a substance having a phosphoric acid backbone such as a phosphoric acid, a phosphate, or a phosphoric ester. In many cases, the phosphorus element is usually present in the form of the phosphoric acid structure in nature. A preferred method for adsorbing phosphorus by the phosphorus adsorbent of the present invention only requires that an aqueous solution containing phosphorus be mixed with the regenerated collagen powder (i.e., the phosphorus adsorbent) or the phosphorus adsorbent body including the carrier. It is desirable that the phosphorus adsorbent or the phosphorus adsorbent body is dispersed in the solution as uniformly as possible to achieve more efficient adsorption. As described above, the regenerated collagen powder, the phosphorus adsorbent, and the phosphorus adsorbent body may exhibit the antibacterial properties.

(2) Carboxymethyl Cellulose Particles and Polyvinyl Alcohol Particles

In the present invention, carboxymethyl cellulose and polyvinyl alcohol also can be used as organic resins of an organic resin powder. Both the carboxymethyl cellulose and the polyvinyl alcohol are water-soluble matrix resin gel components before cross-linking. The carboxymethyl cellulose and the polyvinyl alcohol are cross-linked by bringing them into contact with an aluminum salt and can be changed to water-insoluble resins because the aluminum salt is chemically bonded to the gel components of the resins. In other words, the carboxymethyl cellulose has a —COOH group and a —OH group, and therefore can be cross-linked with the aluminum salt. The polyvinyl alcohol has a —OH group, and therefore can be cross-linked with the aluminum salt. Moreover, the —COOH group may be introduced into the polyvinyl alcohol. In such a case, the amount of the —COOH group introduced may be, e.g., about 0.1 to 5 mol %.

The carboxymethyl cellulose may be, e.g., "carboxymethyl cellulose sodium salt" manufactured by Sigma-Aldrich Co. The polyvinyl alcohol may be, e.g., "anion denatured PVA (A series)", grade: AF17, manufactured by JAPAN VAM & POVAL CO., LTD.

The average primary particle size of the organic resin particles of the present invention is preferably 0.01 µm to 10 µm, more preferably 0.03 µm to 5 µm, even more preferably 0.05 µm to 3 µm, and further preferably 0.07 µm to 2 µm. If the average primary particle size is 0.01 µm to 10 µm, it is possible to achieve a suitable balance between the dispersibility in the coating agent, the adhesiveness to the fiber surface, the durability, and proper reflectivity. If the average primary particle size is 0.03 µm to 5 µm, it is possible to improve the smooth texture of the fiber to be formed. If the average primary particle size is 0.07 µm to 2 µm, it is possible to further improve the smooth texture of the fiber to be formed as well as the combing properties.

3. Antibacterial Coating Agent for Artificial Hair

The antibacterial coating agent for artificial hair of the present invention is used for artificial hair and includes organic resin particles dispersed in an aqueous medium. The organic resin particles are powdered fine particles including an organic resin and an aluminum salt that is chemically bonded to the organic resin. In other words, the antibacterial coating agent for artificial hair can use the above organic resin particles, and the preferred embodiments of the organic resin particles, including the organic resin and the average particles size, are also as described above. The antibacterial coating agent for artificial hair of the present invention can be prepared by adding a 20 wt % organic resin particle aqueous dispersion gradually to an aqueous coating agent solution while stirring with, e.g., a magnetic stirrer, and then adjusting the mixed solution. The aqueous coating agent is suitably in the form of water-dispersed emulsion, and not particularly limited as long as it does not aggregate with the organic resin particles when they are mixed together. For example, since a cationic coating agent is likely to aggregate with the organic resin particles in general, the aqueous coating agent is preferably anionic or nonionic. The aqueous coating agent used in the present invention serves as an additive to bind the organic resin particles (base material) to the fiber surface, and thus preferably contains a binder. The binder can be of any type such as polyurethane, polyamide, polyurea, polyoxazoline, polyester, polyacryl, polyvinyl chloride, polyvinyl alcohol, or polyvinyl acetate as long as it is an aqueous binder. Among them, the polyester, polyacryl, and polyvinyl alcohol binders are particularly preferred because there is no coloring or the like. Therefore, yet another aspect of the present invention relates to a method for producing an antibacterial coating agent for artificial hair that includes mixing the organic resin particles of the present invention with the aqueous coating agent containing the above aqueous binder. With this method, the antibacterial coating agent for artificial hair of the present invention can be produced. The contents and/or mixing ratios of the aqueous binder, the aqueous coating agent, and the organic resin particles will be described later. The antibacterial coating agent for artificial hair of the present invention may include a process of producing the organic resin particles of the present invention. The organic resin particles of the present invention can be produced, e.g., in the manner as described above.

It is preferable that the weight ratio of the total amount of the binder component and the organic resin particles to the aqueous medium is 1:3 to 1:10000. If the weight ratio is within this range, a reduction in tactile properties due to the binder can be prevented, and the adhesiveness of the particles to the fiber is not a problem. Moreover, the weight ratio of solid content of the aqueous coating agent to the organic resin particles is preferably 3:1 to 1:3, and more preferably 1:1 to 1:2. If the weight ratio of solid content is 3:1 to 1:3, it is possible to improve the tactile properties and to prevent the particles from peeling off. The antibacterial coating agent for artificial hair of the present invention includes the organic resin particles including the aluminum salt, and therefore can preferably impart antibacterial properties to the artificial hair when it is used for the artificial hair.

4. Antibacterial Artificial Hair

The antibacterial artificial hair of the present invention includes an artificial hair and organic resin particles adhering to the artificial hair. The artificial hair and the organic resin particles are as described above. The organic resin particles adhering to the fiber surface of the artificial hair is preferably 0.01 to 0.5 wt %, and more preferably 0.05 to 0.2 wt % with respect to the weight of the artificial hair fiber. If the amount of adhesion is 0.01 to 0.5 wt %, it is possible to achieve a suitable balance between the effect of improvement by the adhesion of the fine particles, the durability, the luster or texture, and the combing properties. If the amount of adhesion is 0.05 to 0.2 wt %, it is possible to improve the smooth texture of the fiber. In an embodiment, the antibacterial artificial hair of the present invention can be produced using the antibacterial coating agent for artificial hair of the present invention for the artificial hair. Specifically, the antibacterial coating agent for artificial hair of the present invention is deposited on the artificial hair, so that the organic resin particles adhere to the artificial hair. The aqueous coating agent deposited on the fiber surface of the artificial hair is 0.01 to 1.0 wt %, and preferably 0.05 to 0.5 wt % with respect to the weight of the fiber. If the amount of deposition is 0.01 wt % or more, durability can be imparted to the adhesion of the organic resin particles. If the amount of deposition is 1.0 wt % or less, the effect of improving the texture by the organic resin particles and the yarn division properties can be better. In the present application, the amount of deposition/adhesion (wt %) of the coating agent or the organic resin particles on/to the artificial hair is also expressed as % on mass of fiber (% o. m. f.).

In the present invention, there is no particular limitation to the method for applying the mixed solution of the organic resin particles and the aqueous coating agent (including the antibacterial coating agent for artificial hair of the present invention) to the fiber surface of the artificial hair, and general processing such as a touch roll method, a spraying method, or a dipping method can be used. The mixed solution is applied to the fiber, adjusted to an appropriate amount with a mangle or the like, and then subjected to a dry heat treatment or a wet heat treatment, so that the organic resin particles adhere to the fiber surface. In particular, the dipping method is preferred because the whole fiber surface of the artificial hair can be covered. Therefore, yet another aspect of the present invention relates to a method for producing an antibacterial artificial hair that includes allowing the organic resin particles of the present invention to adhere to the artificial hair. The adhesion of the organic resin particles to the artificial hair may be performed by bringing the antibacterial coating agent for artificial hair of the present invention into contact with the artificial hair, e.g., in the conventional manner as described above. The method for producing the antibacterial artificial hair of the present invention may include a surface treatment after the antibacterial coating agent for artificial hair has been brought into contact with the artificial hair, as will be described later.

As described above, according to the artificial hair and the method for producing the artificial hair of the present invention, due to the action of the organic resin particles adhering to the artificial hair, the fiber surface of the artificial hair becomes hydrophilic, and thus the artificial hair has a moist texture similar to that of human hair. Moreover, the refractive index of the fiber surface is suitably reduced to provide the artificial hair with a natural luster similar to that of human hair.

As the line roughness of the fiber surface of the antibacterial artificial hair of the present invention, an arithmetic average roughness (Ra) is preferably 0.08 to 0.15 μm, and more preferably 0.10 to 0.12 so as to achieve a natural luster similar to that of human hair and good combing properties. If the arithmetic average roughness is 0.08 to 0.15 μm, it is possible to achieve a suitable balance between the smooth texture, the combing properties, and the luster. If the arithmetic average roughness is 0.10 to 0.12 μm, it is possible to further improve the smooth texture and the combing properties.

When the artificial hair of the present invention is a polyester fiber, the organic resin particles are advantageous for the following reasons. Since the organic resin particles have higher hydrophilicity than the particles (e.g., silica) that are generally used for delustering, the dispersibility of the organic resin particles in the aqueous coating agent can be better. Thus, the organic resin particles are not likely to aggregate with each other, and the luster of the artificial hair can be controlled.

In the surface treatment of the present invention, the aqueous coating agent solution including the organic resin particles is applied to the fiber surface, and then dried with hot air at 80° C. to 150° C. for 30 seconds to 30 minutes.

In the present invention, the mixed solution of the organic resin particles and the aqueous coating agent (including the antibacterial coating agent for artificial hair of the present invention) is applied to the fiber surface. This is because, since the coating agent is water-based and the organic resin particles have good dispersibility in water, the organic resin particles are easily dispersed and not likely to aggregate with each other, so that the coating thickness can be uniform. Consequently, the refractive index of the fiber surface is reduced, and the artificial hair has an appropriate luster similar to that of human hair. Moreover, the fiber surface is hydrophilic, and the artificial hair has a moist feeling.

In the context of the present invention, the "adhesion" indicates that the organic resin particles are fixed to the fiber surface using the aqueous coating agent to the extent that they do not peel off the fiber surface even by combing.

In the present invention, the aqueous coating agent may include a perfume, an antistatic agent, etc. To maintain good combing properties, the aqueous coating agent also may include silicone oil, alkylene glycol, camellia oil, etc. With respect to the viscosity, the aqueous coating agent may be either a freely flowing liquid or a creamy liquid.

The antibacterial artificial hair of the present invention preferably exhibits the antibacterial properties. Moreover, the antibacterial artificial hair of the present invention preferably has a luster and a texture that are similar to those of human hair. Further, the antibacterial artificial hair of the present invention can be produced using the antibacterial coating agent for artificial hair of the present invention.

EXAMPLES

Hereinafter, the present invention will be described by way of specific examples, but is not limited thereto. In the following examples, the unit that is simply represented by "%" means "wt %".

(1) Preparation of Regenerated Collagen Powder

Using the flesh split of a cow as a material, 30 g of a hydrogen peroxide aqueous solution that was diluted to 30 wt % was added to 1200 kg of alkali-solubilized hides (collagen content: 180 kg), and then dissolved in a lactic acid aqueous solution to form a stock solution having a pH of 3.5 and a solid content of 7.5 wt %. The stock solution was stirred and defoamed under reduced pressure with a stirring/deforming device (8DMV model manufactured by DALTON CO., LTD.). Subsequently, the stock solution was transferred to a piston-type spinning stock solution tank, allowed to stand under reduced pressure, and defoamed. After the stock solution was extruded by the piston, a constant amount of the stock solution was fed using a gear pump and filtered through a sintered filter (pore diameter: 10 μm). Then, the stock solution passed through a spinning nozzle (pore diameter: 0.275 mm, pore length: 0.5 mm, and number of pores: 300) and was extruded at a spinning speed of 5 m/min into a coagulation bath containing 20 wt % of sodium sulfate at 25° C. (in which the pH was adjusted to 11 with a boric acid and a sodium hydroxide).

Next, the regenerated collagen fibers (300 fibers, 20 m) thus obtained were immersed in 1.32 kg of an aqueous solution containing 1.7 wt % of epichlorohydrin, 0.0246 wt % of sodium hydroxide, and 17 wt % of sodium sulfate at 25° C. for 4 hours. Then, the temperature of the reaction liquid was increased to 43° C., and the regenerated collagen fibers were further impregnated with the aqueous solution for 2 hours.

The reaction liquid was removed after the reaction was finished, and the regenerated collagen fibers were batch washed 3 times with 1.32 kg of water at 25° C. by a flow-type apparatus. Then, the regenerated collagen fibers were impregnated with 1.32 kg of an aqueous solution containing 5 wt % of aluminum sulfate, 0.9 wt % of citric acid trisodium salt, and 1.2 wt % of sodium hydroxide at 30° C., and 13.2 g of a 5 wt % sodium hydroxide aqueous solution was added to the reaction liquid after 2 hours, 3 hours, and 4 hours from the start of the reaction, respectively. The reaction was continued for 6 hours in total. The reaction liquid was removed after the reaction was finished, and the regenerated collagen fibers were batch washed 3 times with 1.32 kg of water at 25° C. by the flow-type apparatus.

Next, part of the resultant fibers was immersed in a bath filled with an oil solution including an emulsion of amino-modified silicone and a Pluronic-type polyether antistatic agent, so that the oil solution adhered to the fibers. A bundle of the fibers was dried in a hot-air convection drier at 50° C. for 2 hours while applying tension in such a manner that one end of the fiber bundle was fixed, and a 2.8 g weight was suspended on each of the fibers at the other end of the fiber bundle. Thus, 60 dtex regenerated collagen fibers were formed.

Next, the regenerated collagen fibers were physically pulverized. Specifically, first, 2 kg of the regenerated collagen fibers were cut to a length of about 1 mm with a cutter mill (SF-8 manufactured by SANRIKI SEISAKUSHO CO., LTD.) and collected with a cyclone CYC-600 model (manufactured by SANRIKI SEISAKUSHO CO., LTD.). Then, pulverization was performed using a vibration mill (manufactured by Token Co.). The pulverization conditions are as follows: alumina balls (diameter: 19 mm) with a filling capacity of 80% and the cut collagen fibers with a filling capacity of 40% (500 g) were placed in a 4 L alumina vessel, and then pulverized for 4 to 12 hours. Consequently, the 4-hour pulverization provided a powder with an average particle size of 33 μm and the 15-hour pulverization provided a powder with an average particle size of 10 μm. The powder with an average particle size of 10 μm was air classified, resulting in powders having the following average particle sizes A to E.

Organic resin particles A: regenerated collagen particles with a particle size of 1.0 μm Organic resin particles B: regenerated collagen particles with a particle size of 0.05 μm Organic resin particles C: regenerated collagen particles with a particle size of 3.0 μm Organic resin particles D: regenerated collagen particles with a particle size of 0.005 μm Organic resin particles E: regenerated collagen particles with a particle size of 11 μm (2) Polyvinyl Alcohol (PVC) Powder The insoluble PVA powder was produced in the following manner. First, a 10% (W/V) aqueous solution of anion denatured polyvinyl alcohol (trade name: AF17, manufactured by JAPAN VAM & POVAL CO., LTD.) was prepared. Then, this aqueous solution was dropped into an aluminum sulfate solution used for the cross-linking of aluminum, thereby forming an insoluble body. The insoluble body was taken out, dried, and crushed into fine particles in a mortar. The fine particles were classified to remove the particles with a particle size of 20 μm or more, so that a fine powder with an average particle size of 11 μm was obtained. This fine powder was air classified, resulting in a powder having the following average particle size F.

Organic resin particles F: polyvinyl alcohol particles with a particle size of 1.0 μm (3) Insoluble Carboxymethyl Cellulose (CMC) Powder First, a 1 wt % aqueous solution of carboxymethyl cellulose sodium salt (CMC manufactured by Sigma-Aldrich Co.) was prepared. Then, this aqueous solution was dropped into an aluminum sulfate solution used for the cross-linking of aluminum, thereby forming an insoluble body. The insoluble body was taken out, dried, and crushed into fine particles in a mortar. The fine particles were air classified, resulting in a powder having the following average particle size F.

Organic resin particles G: carboxymethyl cellulose particles with a particle size of 1.0 μm (4) Other Components Polyester resin: polyethylene terephthalate, BK-2180 manufactured by Mitsubishi Chemical Corporation, IV=0.83

Bromine flame retardant: brominated epoxy flame retardant, SR-T20000 manufactured by SAKAMOTO YAKUHIN KOGYO CO., LTD.

Flame retardant auxiliary: sodium antimonite, SA-A (number average particle size: 2.0 μm) manufactured by NIHON SEIKO CO., LTD.

Aqueous coating agent A: TK SET 413, polyester binder, manufactured by TAKAMATSU OIL & FAT CO., LTD.

Aqueous coating agent B: HI-RESIN R-4514E, acrylic binder, manufactured by TAKAMATSU OIL & FAT CO., LTD.

Silica: IMSILA-8 (number average particle size: 2 to 3 μm) manufactured by UNIMIN CORPORATION (5) Measurement Methods The measuring methods of the characteristic values are as follows. The measurement was performed at 25° C. and a relative humidity of 60% RH unless otherwise noted.

(Line Roughness of Fiber Surface)

In the present invention, the size of a projection from the fiber surface was determined as an arithmetic average roughness (Ra) by a laser microscope (VK-9500 manufactured by KEYENCE CORPORATION). The side of the fiber was observed at 3000× magnification (objective lens 150×× built-in lens 20×) to measure 10 lines parallel to the fiber axis. The images were analyzed based on the arithmetic expression in accordance with the definition of the surface roughness in JIS B0601-1994.

(Combing Properties)

The top of a tow filament having a length of 30 cm and a total fineness of 100000 dtex was held in one hand to allow the tow filament to be hung vertically. Then, the tow filament was combed 30 times by running a comb (NEW DELRIN COMB No. 826) from a point 3 cm below the top of the tow filament down through it at a speed of 0.3 m/s. Thereafter, the tow filament was further combed 10 times, and the 31st to 40th combing properties were evaluated as a measure of ease of combing.

A: The tow filament is combed with almost no resistance (light).

B: The tow filament is combed with a little resistance (heavy).

C: The tow filament is combed with a considerable resistance, or cannot be combed through and the comb is caught in the middle of the tow filament.

(Luster of Fiber)

The top of a tow filament having a length of 30 cm and a total fineness of 100000 dtex was fixed to a wig mannequin head with pins. Then, the tow filament was visually evaluated in the sunlight by the following criteria.

A: The luster is close to that of human hair.

B: The luster is slightly higher than that of human hair.

C: The luster is clearly higher than that of human hair.

(Tactile Properties)

A tow filament having a length of 30 cm and a total fineness of 100000 dtex was touched by hand, and the tactile properties of the filament surface were evaluated.

A: The tow filament feels moist and has a texture that is very close to that of human hair.

B: The tow filament feels slightly moist and has a texture that is close to that of human hair.

C: The tow filament is dry and waxy.

(Shampoo Resistance)

One end of a tow filament having a length of 30 cm and a total fineness of 100000 dtex was fixed with INSULOK (registered trade mark). The tow filament was washed by rubbing for 30 seconds in a 2 L hot water (40° C.) containing 10 ml of EMAL 20C (sodium polyoxyethylene lauryl ether sulfate manufactured by Kao Corporation). Then, the tow filament was thoroughly rinsed with hot water at 40° C. and dried. The luster and tactile properties of the tow filament were evaluated after repeating the shampoo operation 5 times.

A: The luster and the tactile properties are unchanged.

B: The luster and the tactile properties are changed, but practically no problem.

C: The organic resin particles peel off, so that the luster and the tactile properties are changed.

(Antibacterial Properties)

A test sample was prepared by expanding the tow filament to a width of 5 cm and cutting it to a length of 5 cm. This sample was used for an antibacterial test. The antibacterial test was performed in the following manner. First, *Escherichia coli* (IFO3972) were grown in 5 ml of a nutrient broth culture medium (manufactured by Eiken Chemical Co., Ltd.) by shaking overnight at 27° C. Then, the culture medium was diluted in a sterile physiological saline (0.85 wt % NaCl) containing a nutrient broth culture medium at a final concentration of 1/500. 0.4 ml of this bacterial suspension was placed in a plastic petri dish (manufactured by SEIBU CO., LTD.), and the sample was put on the bacterial suspension with its test surface facing down. The petri dish was covered with a lid and allowed to stand at 30° C. The bacterial suspension was collected in 4.5 ml of sterile physiological saline at the time of inoculation and 24 hours after the inoculation, and then diluted 10 times at each step of five serial dilutions. The number of viable cells in 0.5 ml of the bacterial suspension was measured. In this case, a polyethylene sheet was used instead of the sample as a reference, and the same operation was performed. The measurement of the number of viable cells was conducted in accordance with Standard Methods of Analysis for Hygienic Chemists with Commentary (2005), 1.2.1.1 General Test Procedures for Bacteria, 3) Bacterial Measurement, (1) Pour Plate Method (p. 59). The microorganisms were cultured at 37° C. for 24 hours using a SCDLP agar medium ("DAIGO" manufactured by NIHON PHARMACEUTICAL CO., LTD.). The number of viable cells was converted into a viable cell concentration in the bacterial suspension inoculated into the sample. The detection limit of the number of viable cells was less than $10^2$ cell/ml. The evaluation criteria are as follows.

A: Undetected

B: The number of viable cells was not less than $1 \times 10^2$ cell/ml and less than $4 \times 10^6$ cell/ml.

C: The number of viable cells was not less than $4 \times 10^6$ cell/ml.

Manufacturing Example 1

100 parts by weight of the polyethylene terephthalate "BK-2180" manufactured by Mitsubishi Chemical Corporation, 20 parts by weight of the brominated epoxy flame retardant "SR-T20000" manufactured by SAKAMOTO YAKUHIN KOGYO CO., LTD., and 2 parts by weight of the flame retardant auxiliary, sodium antimonite, "SA-A" manufactured by NIHON SEIKO CO., LTD. were dried to reduce the moisture content to 100 ppm or less, and then dry blended. Subsequently, 2 parts by weight of coloring polyester pellet PESM 6100 BLACK (manufactured by Dainichiseika Color & Chemicals Mfg. Co., Ltd., carbon black content: 30%, polyester: BK-2180) were added to the mixture and dry blended. This blend was supplied to a twin-screw extruder (TEX44 manufactured by Japan Steel Works, LTD.) and melt kneaded at a barrel temperature of 280° C. to form pellets, which then were dried to reduce the moisture content to 100 ppm or less.

Next, the pellets that were dried to have a moisture content of 100 ppm or less were supplied to a melt spinning machine (5V30 manufactured by SHINKO IND. LTD.), and a molten polymer was extruded through a spinneret with nozzle holes having a cocoon-shaped cross section (with an aspect ratio of 1.4:1) at a barrel temperature of 280° C. The resultant spun yarns were air-cooled with a cooling air at 20° C. and wound up at a speed of 100 m/min, thereby providing undrawn yarns. The undrawn yarns were drawn 4 times using a heating roller at 85° C., heat-treated using the heating roller at 200° C., and wound up at a speed of 30 m/min. Thus, a polyester monofilament fiber with a fineness of 60 dtex was produced.

Manufacturing Example 2

A copolymer resin including 49 wt % of acrylonitrile, 50 wt % of vinyl chloride, and 1 wt % of sodium styrenesulfonate was dissolved in acetone to prepare a 29 wt % spinning stock solution. The viscosity of the stock solution after sufficient mixing was 56 poise at 48° C. The stock solution was extruded through a spinning nozzle (dumbbell-shaped) at a nozzle draft of 1.8 into a 18 wt % acetone aqueous solution at 20° C. The resultant fibers were immersed in a water washing bath at 60° C. to remove the solvent, drawn 1.5 times, and then dried at 130° C. Thereafter, the fibers were dry heat drawn 2.5 times at 120° C. and further subjected to a relaxation heat treatment by dry heating at 150° C. Thus, a modacrylic monofilament fiber with a fineness of 60 dtex was produced.

Manufacturing Example 3

100 parts by weight of a vinyl chloride resin, 10 parts by weight of a cross-linked vinyl chloride resin, and 2 parts by weight of a ethylene-(meth)acrylic acid alkyl ester resin were mixed. Moreover, the mixture was blended with 3 parts by weight of dibutyltin maleate, 1 part by weight of dibutyltin laurate, 0.5 parts by weigh of synthetic wax, 0.5 parts by weight of a stearic acid, and 1.0 part by weight of a processing aid. This blend was stirred with a ribbon blender at 110° C. for 40 minutes. Subsequently, the resin composition was formed into pellets using an extruder at a cylinder temperature of 140° C. and a die temperature of 145° C. A nozzle with a pore diameter of 0.7 mm φ was attached to a 30 mm (I) extruder (L/D=20), and the resin composition pellets were extruded at a cylinder temperature of 150 to 180° C. and a nozzle temperature of 180±15° C., and then spun by a first wind-up roll. Next, the resultant spun yarns were drawn 2.5 times through a hot air circulating box at 110° C. between the first wind-up roll and a second drawing roll. Moreover, the spun yarns traveled between two pairs of cone-shaped rolls located in a box where the temperature was controlled to 115° C., and were continuously subjected to a 25% relaxation treatment. Thus, a vinyl chloride monofilament fiber with a fineness of 60 dtex was produced.

Examples 1 to 12

In the examples, the monofilament obtained by the manufacturing example 1 was treated as shown in Tables 1 and 2. A solution including the organic resin particles was adjusted so that organic resin particles/solid content of aqueous coating agent=0.2% o. m. f./0.2% o. m. f., applied to the monofilament, and dried at 120° C. for 30 minutes with a hot-air drier. Moreover, a fiber treatment agent, in which KWC-Q (ethylene oxide-propylene oxide random copolymerized polyether manufactured by MARUBISHI OIL CHEMICAL CO., LTD.)/KWC-B (amino-modified silicone manufactured by MARUBISHI OIL CHEMICAL CO., LTD.)/processing agent 29 (cationic surface active agent manufactured by MARUBISHI OIL CHEMICAL CO., LTD.)=0.10% o. m. f./0.20% o. m. f./0.05% o. m. f., was applied to the monofilament and dried at 120° C. for 10 minutes with the hot-air drier.

The luster, tactile properties, combing properties, antibacterial properties, and shampoo resistance of the resultant fiber were evaluated by the methods as described above. Tables 1 and 2 show the results.

Comparative Examples 1 to 2

In the examples, the monofilament obtained by the manufacturing example 1 was treated as shown in Table 2. A solution including the organic resin particles and silica was adjusted so that particles/solid content of aqueous coating agent=0.2% o. m. f./0.2% o. m. f., applied to the monofilament, and dried at 120° C. for 30 minutes with a hot-air drier. Moreover, a fiber treatment agent, in which KWC-Q (ethylene oxide-propylene oxide random copolymerized polyether manufactured by MARUBISHI OIL CHEMICAL CO., LTD.)/KWC-B (amino-modified silicone manufactured by MARUBISHI OIL CHEMICAL CO., LTD.)/processing agent 29 (cationic surface active agent manufactured by MARUBISHI OIL CHEMICAL CO., LTD.)=0.10% o. m. f./0.20% o. m. f./0.05% o. m. f., was applied to the monofilament and dried at 120° C. for 10 minutes with the hot-air drier.

The luster, tactile properties, combing properties, antibacterial properties, and shampoo resistance of the resultant fiber were evaluated by the methods as described above. Table 2 shows the results.

TABLE 1

| Examples | | 1 | 2 | 3 | 4 | 5 | 6 | 7 | 8 | 9 | 10 | 11 | 12 |
|---|---|---|---|---|---|---|---|---|---|---|---|---|---|
| Polyester monofilament fiber formed by Manufacturing Example 1 (parts by weight) | | 100 | 100 | 100 | 100 | 100 | 100 | 100 | 100 | 100 | 100 | | |
| Modacrylic monofilament fiber formed by Manufacturing Example 2 (parts by weight) | | | | | | | | | | | | 100 | |
| Vinyl chloride monofilament fiber formed by Manufacturing Example 3 (parts by weight) | | | | | | | | | | | | | 100 |
| Organic resin particles | A(% omf) | 0.2 | 0.2 | | | | | 0.01 | 0.5 | 0.3 | 0.3 | 0.2 | 0.2 |
| | B(% omf) | | | 0.2 | | | | | | | | | |
| | C(% omf) | | | | 0.2 | | | | | | | | |
| | D(% omf) | | | | | | | | | | | | |
| | E(% omf) | | | | | | | | | | | | |
| | F(% omf) | | | | | 0.2 | | | | | | | |
| | G(% omf) | | | | | | 0.2 | | | | | | |
| Binder | A(% omf) | 0.2 | | 0.2 | 0.2 | 0.2 | 0.2 | 0.01 | 0.5 | 0.9 | 0.1 | 0.2 | 0.2 |
| | B(% omf) | | 0.2 | | | | | | | | | | |
| Fineness (dtex) | | 61 | 61 | 61 | 61 | 61 | 61 | 61 | 61 | 61 | 61 | 60 | 60 |
| Strength (cN/dtex) | | 1.8 | 1.8 | 1.8 | 1.8 | 1.8 | 1.8 | 1.8 | 1.8 | 1.8 | 1.8 | 1.5 | 1.5 |
| Line roughness (μm) | | 0.10 | 0.10 | 0.09 | 0.13 | 0.09 | 0.10 | 0.10 | 0.12 | 0.14 | 0.12 | 0.13 | 0.14 |
| Luster | | A | A | A | A | A | A | A | A | A | A | A | A |
| Tactile properties | | A | A | A | A | A | A | A | A | A | A | A | A |
| Combing properties | | A | A | A | A | A | A | A | A | A | A | A | A |
| Antibacterial properties | | A | A | A | A | A | A | A | A | A | A | A | A |
| Shampoo resistance | | A | A | A | A | A | A | A | A | A | A | A | A |

TABLE 2

| Examples | | 13 | 14 | 15 | 16 | 17 | 18 | Comparative Example 1 | Comparative Example 2 |
|---|---|---|---|---|---|---|---|---|---|
| Polyester monofilament fiber formed by Manufacturing Example 1 (parts by weight) | | 100 | 100 | 100 | 100 | 100 | 100 | 100 | 100 |
| Modacrylic monofilament fiber formed by Manufacturing Example 2 (parts by weight) | | | | | | | | | |
| Vinyl chloride monofilament fiber formed by Manufacturing Example 3 (parts by weight) | | | | | | | | | |
| Organic resin particles | A(% omf) | | | 0.005 | 0.6 | 0.2 | 0.2 | | |
| | B(% omf) | | | | | | | | |
| | C(% omf) | | | | | | | | |
| | D(% omf) | 0.2 | | | | | | | |
| | E(% omf) | | 0.2 | | | | | | |
| | F(% omf) | | | | | | | | |
| | G(% omf) | | | | | | | | |
| Silica | IMSILA-8(% omf) | | | | | | | | 0.2 |
| Binder | A(% omf) | 0.2 | 0.2 | 0.005 | 0.6 | 0.8 | 0.05 | 0.2 | 0.2 |
| | B(% omf) | | | | | | | | |
| Fineness (dtex) | | 61 | 61 | 61 | 61 | 61 | 61 | 61 | 61 |
| Strength (cN/dtex) | | 1.8 | 1.8 | 1.8 | 1.8 | 1.8 | 1.8 | 1.8 | 1.8 |
| Line roughness (μm) | | 0.08 | 0.15 | 0.09 | 0.14 | 0.10 | 0.09 | 0.12 | 0.12 |
| Luster | | B | A | B | A | A | A | C | A |
| Tactile properties | | A | B | B | B | B | A | C | C |
| Combing properties | | A | B | A | B | B | A | A | C |
| Antibacterial properties | | A | A | B | A | A | A | C | C |
| Shampoo resistance | | A | A | A | A | A | B | A | A |

As can be seen from the evaluation results of Examples 1 to 18 and Comparative Examples 1 to 2 shown in Tables 1 to 2, it is evident that the method of the present invention can provide both the luster and texture suitable for the artificial hair and the antibacterial properties. In Examples 1 to 12, the fibers have a luster that is very similar to that of human hair, a moist texture, and good combing properties. Therefore, the fibers of Examples 1 to 12 satisfy the required quality of artificial hair in a particularly well-balanced manner. The fibers also have sufficient antibacterial properties. Thus, it can be expected that any products made from these fibers will be kept clean. In Example 13, the luster is slightly higher than that of human hair. In Examples 14, 16, and 17, the texture is slightly bad and the combing properties are slightly low. In Example 18, although the organic resin particles peel off a little during shampooing, the fiber generally satisfies the required characteristics of artificial hair for practical use.

On the other hand, in Comparative Example 1, since the organic resin particles of the present invention do not adhere to the fiber, it has a strong luster, is clammy to the touch, and thus differs from human hair. Furthermore, the fiber does not have any antibacterial properties. In Comparative Example 2, the fiber has poor tactile and combing properties, and also do not have any antibacterial properties.

The invention claimed is:

1. An antibacterial artificial hair comprising:
an artificial hair having a fineness of from 10 to 100 dtex; and
organic resin particles adhering to the artificial hair,
wherein the organic resin particles are powdered fine particles including pulverized particles of regenerated collagen and an aluminum salt that is chemically bonded to the pulverized particles of regenerated collagen.

2. The antibacterial artificial hair according to claim 1, wherein the organic resin particles further include a cross-linking component composed of an organic compound, and the cross-linking component is derived from a monofunctional epoxy compound expressed by the following general formula (1):

[Chemical Formula 1]

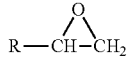

(1)

where R represents a substituent expressed as $R^1$—, $R^2$—O—$CH_2$—, or $R^2$—COO—$CH_2$—, $R^1$ represents a hydrocarbon group having a carbon number of 2 or more or $CH_2Cl$, and $R^2$ represents a hydrocarbon group having a carbon number of 2 or more.

3. The antibacterial artificial hair according to claim 1, wherein the aluminum salt is a basic aluminum chloride or a basic aluminum sulfate expressed as $Al(OH)_nCl_{3-n}$ or $Al_2(OH)_{2n}(SO_4)_{3-n}$, where n is 0.5 to 2.5.

4. The antibacterial artificial hair according to claim 1, wherein an average particle size of the organic resin particles is 0.01 to 10 μm.

5. The antibacterial artificial hair according to claim 1, wherein the organic resin particles have a phosphorus adsorption capacity.

6. The antibacterial artificial hair according to claim 1, wherein a line roughness Ra of a fiber surface of the antibacterial artificial hair is 0.08 to 0.15 μm.

7. The antibacterial artificial hair according to claim 1, wherein the fiber of the artificial hair includes at least one selected from the group consisting of a polystyrene fiber, a polyphenylene ether fiber, a polyolefin fiber, a polyvinyl chloride fiber, a polyamide fiber, a polyester fiber, a polyphenylene sulfide fiber, a polymethacrylate fiber, and an acrylic fiber.

8. The antibacterial artificial hair according to claim 1, wherein the organic resin particles adhering to the artificial hair is 0.01 to 0.5 wt %.

9. The antibacterial artificial hair according to claim 1, wherein the organic resin particles are present in an amount sufficient to impart antibacterial properties to a hair product.

10. An antibacterial coating agent for artificial hair comprising:
organic resin particles dispersed in an aqueous medium,
wherein the organic resin particles are powdered fine particles including pulverized particles of regenerated collagen and an aluminum salt that is chemically bonded to the pulverized particles of regenerated collagen, and
wherein the antibacterial coating agent is adhered to the surface of artificial hair having a fineness of from 10 to 100 dtex.

11. The antibacterial coating agent for artificial hair according to claim 10, wherein the organic resin particles further include a cross-linking component composed of an organic compound, and the cross-linking component is derived from a monofunctional epoxy compound expressed by the following general formula (1):

[Chemical Formula 1]

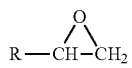

(1)

where R represents a substituent expressed as $R^1$—, $R^2$—O—$CH_2$—, or $R^2$—COO—$CH_2$—, $R^1$ represents a hydrocarbon group having a carbon number of 2 or more or $CH_2Cl$, and $R^2$ represents a hydrocarbon group having a carbon number of 2 or more.

12. The antibacterial coating agent for artificial hair according to claim 10, wherein the aluminum salt is a basic aluminum chloride or a basic aluminum sulfate expressed as $Al(OH)_nCl_{3-n}$ or $Al_2(OH)_{2n}(SO_4)_{3-n}$, where n is 0.5 to 2.5.

13. The antibacterial coating agent for artificial hair according to claim 10, wherein an average particle size of the organic resin particles is 0.01 to 10 μm.

14. The antibacterial coating agent for artificial hair according to claim 10, further comprising a binder component,
wherein a weight ratio of the binder component to the organic resin is 3:1 to 1:3.

15. The antibacterial coating agent for artificial hair according to claim 14, wherein a weight ratio of a total amount of the binder component and the organic resin to the aqueous medium is 1:3 to 1:10000.

16. The antibacterial coating agent for artificial hair according to claim 14, wherein the binder component is at least one resin selected from the group consisting of a polyurethane resin, a polyamide resin, a polyurea resin, a polyoxazoline resin, a polyester resin, a polyacrylic resin, a polyvinyl chloride resin, a polyvinyl alcohol resin, and a polyvinyl acetate resin.

17. The antibacterial coating agent for artificial hair according to claim 10, wherein the organic resin particles are present in an amount sufficient to impart antibacterial properties to an artificial hair.

18. A method for producing an antibacterial coating agent for artificial hair comprising:
mixing powdered fine particles including pulverized particles of regenerated collagen and an aluminum salt that is chemically bonded to the pulverized particles of regenerated collagen with an aqueous coating agent containing an aqueous binder, and
applying the antibacterial coating agent to the surface of artificial hair having a fineness of from 10 to 100 dtex.

19. A method for producing an antibacterial artificial hair comprising:
adhering powdered fine particles including pulverized particles of regenerated collagen and an aluminum salt that is chemically bonded to the pulverized particles of regenerated collagen to an artificial hair having a fineness of from 10 to 100 dtex.

20. The antibacterial artificial hair according to claim 1, wherein the artificial hair is selected from the group consisting of a hairpiece, a hair wig, a hair extension, a hair bundle and a doll hair.

21. The antibacterial coating agent for artificial hair according to claim 10, wherein the artificial hair is selected from the group consisting of a hairpiece, a hair wig, a hair extension, a hair bundle and a doll hair.

22. The method for producing an antibacterial artificial hair according to claim 18, wherein the artificial hair is selected from the group consisting of a hairpiece, a hair wig, a hair extension, a hair bundle and a doll hair.

23. The method for producing an antibacterial artificial hair according to claim 19, wherein the artificial hair is selected from the group consisting of a hairpiece, a hair wig, a hair extension, a hair bundle and a doll hair.

24. A method of using an antibacterial coating agent for artificial hair comprising:
dispersing organic resin particles in an aqueous medium, wherein the organic resin particles are powdered fine particles including pulverized particles of regenerated collagen and an aluminum salt that is chemically bonded to the pulverized particles of regenerated collagen, and
applying the antibacterial coating agent to the surface of artificial hair.

25. The method of using an antibacterial coating agent for artificial hair according to claim 24, wherein the organic resin particles further include a cross-linking component composed of an organic compound, and the cross-linking component is derived from a monofunctional epoxy compound expressed by the following general formula (1):

[Chemical Formula 1]

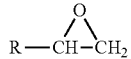

(1)

where R represents a substituent expressed as $R^1$—, $R^2$—O—$CH_2$—, or $R^2$—COO—$CH_2$—, $R^1$ represents a hydrocarbon group having a carbon number of 2 or more or $CH_2Cl$, and $R^2$ represents a hydrocarbon group having a carbon number of 2 or more.

26. The method of using an antibacterial coating agent for artificial hair according to claim 24, wherein the aluminum salt is a basic aluminum chloride or a basic aluminum sulfate expressed as $Al(OH)_nCl_{3-n}$ or $Al_2(OH)_{2n}(SO_4)_{3-n}$, where n is 0.5 to 2.5.

27. The method of using an antibacterial coating agent for artificial hair according to claim 24, wherein an average particle size of the organic resin particles is 0.01 to 10 μm.

28. The method of using an antibacterial coating agent for artificial hair according to claim 24, wherein the antibacterial coating agent for artificial hair further comprises a binder component,
wherein a weight ratio of the binder component to the organic resin is 3:1 to 1:3.

29. The method of using an antibacterial coating agent for artificial hair according to claim 28, wherein a weight ratio of a total amount of the binder component and the organic resin to the aqueous medium is 1:3 to 1:10000.

30. The method of using an antibacterial coating agent for artificial hair according to claim 28, wherein the binder component is at least one resin selected from the group consisting of a polyurethane resin, a polyamide resin, a polyurea resin, a polyoxazoline resin, a polyester resin, a polyacrylic resin, a polyvinyl chloride resin, a polyvinyl alcohol resin, and a polyvinyl acetate resin.

31. The method of using an antibacterial coating agent for artificial hair according to claim 24, wherein the organic resin particles are present in an amount sufficient to impart antibacterial properties to an artificial hair.

32. The method of using an antibacterial coating agent for artificial hair according to claim 24, wherein
the artificial hair is selected from the group consisting of a hairpiece, a hair wig, a hair extension, a hair bundle and a doll hair.

* * * * *